United States Patent [19]

Sawyer

[11] 4,333,317

[45] Jun. 8, 1982

[54] SUPERHEAT CONTROLLER

[75] Inventor: George N. Sawyer, Flint, Tex.

[73] Assignee: General Electric Company, Louisville, Ky.

[21] Appl. No.: 175,168

[22] Filed: Aug. 4, 1980

[51] Int. Cl.³ ............................................. F25B 41/04
[52] U.S. Cl. ........................................ 62/212; 62/225
[58] Field of Search ................ 62/210, 212, 225, 222, 62/224, 204, 209

[56] References Cited

U.S. PATENT DOCUMENTS

| | | | |
|---|---|---|---|
| 2,260,682 | 10/1941 | Robson | 62/212 |
| 2,355,894 | 8/1944 | Ray | 62/225 |
| 2,786,336 | 3/1957 | Lange | 62/8 |
| 3,054,273 | 9/1962 | McGrath | 62/212 X |
| 3,577,743 | 5/1971 | Long | 62/225 X |
| 3,667,247 | 6/1972 | Proctor | 62/225 X |
| 3,698,204 | 10/1972 | Schlotterbeck et al. | 62/225 X |
| 3,738,119 | 6/1973 | Scherer et al. | 62/224 X |
| 3,810,366 | 5/1974 | Orth | 62/225 X |
| 3,913,347 | 10/1975 | Stevens | 62/209 |
| 4,112,703 | 9/1978 | Kountz | 62/225 X |

FOREIGN PATENT DOCUMENTS 639710 7/1950 United Kingdom .................. 62/212

Primary Examiner—Albert J. Makay
Assistant Examiner—Harry Tanner
Attorney, Agent, or Firm—Frank P. Giacalone; Radford M. Reams

[57] ABSTRACT

An automatic control for a refrigeration system for regulating the superheat of refrigerant in its gaseous phase existing in the system. The control includes a sensor arranged in thermal control with the system suction line that is divided by a diaphragm into two chambers. One chamber is exposed to suction gas and the other chamber contains a fluid that is essentially the same as the system refrigerant. Mounted on the diaphragm is a four leg strain gage bridge sensor that produces an electrical signal in response to the pressure differential between the chambers.

4 Claims, 3 Drawing Figures

SUPERHEAT CONTROLLER

BACKGROUND OF THE INVENTION

The present invention is directed to an automatic control for refrigeration system and more particularly to a control for regulating the superheat of refrigerant in its gaseous phase existing in the suction side of the system.

Conventional refrigerator systems employ a recirculating refrigerant for removing heat from the low temperature side of the system and for discharging heat at the high temperature side. A motor driven compressor which receives low-pressure gaseous phase refrigerant and compresses it at a high pressure provides the work input necessary for the operation of the system.

The high pressure gasious phase refrigerant is supplied to a condenser where heat is removed from the refrigerant to convert it to a liquid. The liquid is then supplied through an expansion valve to the evaporator where the liquid receives heat from the cooling load, which causes the refrigerant to revert to the gaseous form. The gaseous refrigerant is then returned to the compressor for recirculation.

The amount of heat absorbed by the refrigerant in the evaporator includes the heat of vaporization of the refrigerant; that is, the amount of heat which must be absorbed by a liquid at a given temperature to convert it to a gas at the same temperatures. In addition, the gaseous refrigerant resulting from the conversion of the liquid refrigerant may absorb additional heat, which raises its temperature above the temperature of vaporization. The gaseous refrigerant in such a state is said to be superheated and the amount by which the temperature of the gas is raised above the vaporization temperature is expressed in degrees of superheat.

In many applications of refrigeration systems, such as low temperature applications, it is desired to prevent superheating of the gaseous refrigerant or to regulate the superheat of the refrigerant to a preselected magnitude. This must be accomplished by controlling the flow of liquid refrigerant into the evaporator.

In an effort to provide better control of the gaseous refrigerant superheat, devices responsive to the temperature and/or pressure of the refrigerant itself have been placed at the outlet of the evaporator to control the amount of liquid refrigerant entering the evaporator as a function of the temperature and/or pressure of the refrigerant leaving the evaporator.

SUMMARY OF THE INVENTION

An object of the invention is to provide an electrically actuated refrigerant flow control system wherein the signal represents a direct measure of suction gas superheat.

The refrigerant control system of the present invention is incorporated in a refrigerant system having a compressor, a condenser, an electro-mechanical expansion means for regulating refrigerant flow and an evaporator connected in series flow arrangement. A control for modulating refrigerant flow through the expansion means in accordance with the superheat in the suction line includes a sensor arranged in thermal contact with the suction line. The sensor includes a cavity that is divided into a first and second chamber by a differential pressure sensing element. A two phase fluid that is essentially the same as the refrigerant in the system is arranged in the second chamber. A conduit connects the first chamber to the suction line so that the first chamber is at suction line pressure. Electric signal producing elements associated with the dividing diaphragm which is responsive to pressure differential between the chambers produce an electric signal when superheat in the suction line causes an increase in the pressure in the second chamber. The electric signal effectively causes the expansion device to modulate liquid refrigerant flow to the evaporator.

DESCRIPTION OF THE PREFERRED EMBODIMENT

Figure 1:
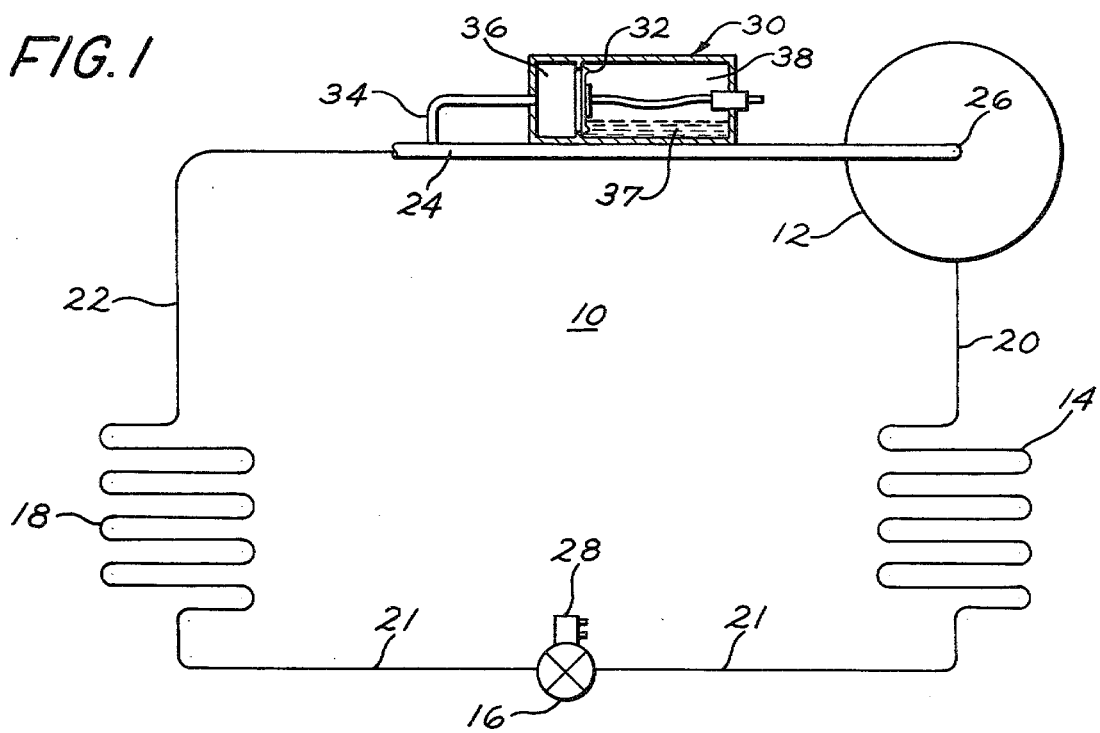
FIG. 1 is a diagrammatic view of a refrigeration system incorporating the present invention.

With reference to FIG. 1 of the drawings, the disclosed refrigeration system 10 includes a compressor 12, a condenser 14, an expansion device 16 and an evaporator 18, the four components being intercoupled in series to form a conventional closed vapor cycle refrigeration system. For reasons to become apparent, the expansion device takes the form of an electro-mechanical valve such as a solenoid operated valve similar to the Sporlan Manufacturing Company, Model EEV7.

High pressure refrigerant gas is compressed in the compressor 12 and supplied to condenser 14 through a discharge conduit 20 where it is condensed to liquid refrigerant. The refrigerant then flows through line 21 and through solenoid expansion valve 16. The refrigerant expands as it flows through valve 16 and emerges as a low pressure two-phase mixture of liquid and gas but primarily a liquid. As the two phase mixture then flows through the evaporator 18, heat is transferred from the air to the refrigerant and all of the refrigerant vaporizes and assumes its gaseous state. The refrigerant gas at the evaporator outlet 22 is then passed through the suction conduit 24 to the suction inlet 26 of the compressor 12.

The expansion device 16 includes a solenoid 28 that is activated to adjust the flow of liquid refrigerant to the evaporator to balance compressor pumping capacity during a wide range of conditions. By the present invention, means are provided to adjust the flow of liquid refrigerant to the evaporator by producing an electrical control signal that represents a direct measure of the return or suction gas superheat. To this end, a superheat sensing member 30 is arranged in thermal contact with the suction line 24. The member 30 is essentially a closed container providing a cavity which is divided into two chambers on areas 36 and 38 that are isolated from each other by a differential pressure sensitive flexible diaphragm 32. A conduit 34 connected at one end to the suction line 24 at its other end with area 36 effectively maintains area 36 at suction gas pressure. In effect, the pressure in area 36 has a direct influence on one side of diaphragm 32. The area 38 contains a limited fluid charge that consists preferably of a fluid 37 having characteristics approaching or identical with those of the refrigerant employed in the system. Due to its thermal contact with suction line 24, the temperature of fluid 37 will be the same as the temperature of the superheated suction gas in 24. However, the pressure in area 38 will be higher than in suction line 24 and area 36 because it is a sealed area, and will reach the saturation pressure of the superheat temperature, whereas the pressure in area 36 will be at the saturation pressure of the evaporator temperature not effected by the superheat. The diaphragm 32 is capable of flexing action under influence of a differential in fluid pressure change occurring by reason of thermal effects imparted to the fluid 37 in area 38 in response to changes in temperature of suction line 24 and to changes in pressure in area 36 in suction line 24. In effect, when fluid in area 38 is a two phase charge of the same fluid as in the suction line, the difference in pressure developed across the pressure responding element or diaphragm 32 will be a direct measure of the superheat in suction line 24.

Figure 2:
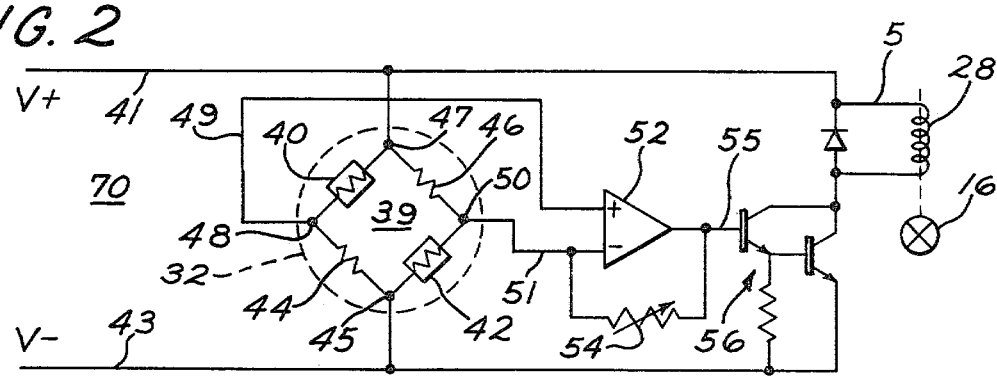
FIG. 2 is the schematic circuit showing the control for regulating the expansion device.

By the present invention, the pressure responding characteristic of diaphragm 32 is converted to an electrical signal that is used to actuate solenoid 28 and accordingly modulate the liquid flow to the evaporator as a function of superheat in line 24. Referring to FIG. 2 of the drawings, there is shown the present control means 70 of sensing the differential pressure between areas 36 and 38 in the superheat pressure sensing member 30 and actuating the expansion device 16 in response to superheat. The differential pressure sensing diaphragm 32 in the superheat pressure sensing member 30 and more particularly the side facing area 38 has mounted thereon a four leg strain gage bridge sensor 39. The bridge sensor 39 includes two active strain sensing elements or resistors 40 and 42, and two ballast elements or resistors 44 and 46. While many types of sensors may be employed, the presently preferred embodiment of the invention utilizes resistive elements 40 and 42, the resistance of which varies as a function of strain in the diaphragm. The flexing of diaphragm 32 in response to pressure differential between chambers 36 and 38 causes stretching of the resistive elements 40 and 42. This stretching causes them to change their resistance. This diaphragm and resistive combination as used in the present embodiment is of the type manufactured by the National Semiconductor Co. and identified by their model number LX0603 monolithic pressure transducer. Because of the diaphragms movement relative to the pressure differences of the chambers 36 and 38, the active sensors 40 and 42 will, in effect, as will be explained hereinafter, cause an electric signal to be produced when the pressure differential between chambers 36 and 38 is at a predetermined level. The bridge sensor 39 in the present instance is designed to be inherently insensitive to changes in either supply voltage or temperature changes.

Control means 70 receives power through lines 41 and 43 and includes the electric bridge 39 and an amplifier 52. The electric bridge 39 of the Wheatstone type has its input terminals 45 and 47 connected across lines 41 and 43. Bridge 39 includes a pair of voltage dividers, each comprised of a pair of center tapped resistive elements, extending between terminals 45 and 47. The center tap of each voltage divider comprises an output terminal 48 and 50 of bridge 39 and the magnitude and polarity of the voltage existing between the output terminals is an indication of the relative resistance of the various resistive elements in the voltage dividers.

Considering the bridge 39 in detail, conductor 43 is connected to input terminal 45. A fixed resistor 44 of a preselected magnitude is connected between input terminal 45 and output terminal 48. The resistive element or pressure sensor 40 is connected between output terminal 48 and input terminal 47. Input terminal 47 is connected to line 41. Resistor 44 and strain responsive element 40 form one of the voltage dividers. The second voltage divider of bridge 39 is formed by the second strain responsive resistive element 42 which is connected between input terminal 45 and output terminal 50 and fixed resistor 46 similar to resistor 44 is connected between input terminal 47 and output terminal 50.

The output signal of bridge 39 consists of the differential voltage existing between output terminals 48 and 50. This differential voltage is provided in conductors 49 and 51 connected to output terminals 48 and 50 respectively. The conductors 49 and 51 being connected to the input terminals of amplifier 52 where the signal is amplified, and provided to conductor 55 as the controlling signal to solenoid 28. In operation as the diaphragm 32 flexes in response to a differential pressure, the resistance of the strain responsive active elements 40 and 42 change in unison while the resistance of the ballast elements 44 and 46 remain constant. This change of resistance of elements 40 and 42 causes the difference in voltage at 48 and 50 to change, with 48 becoming more positive as the superheat increases. This change causes a differential in the flow of current to the differential amplifier 52. A variable resistor is provided as a means of adjusting the set point or calibration of the control. The amplified current flows through a transistor pair 56 which in turn drives the solenoid 28 of electromechanical expansion valve 16. The operation of valve 16 is effective to modulate the flow of liquid refrigerant to the evaporator where an increase in superheat will cause the valve to allow an increase in refrigeration flow.

Figure 3:
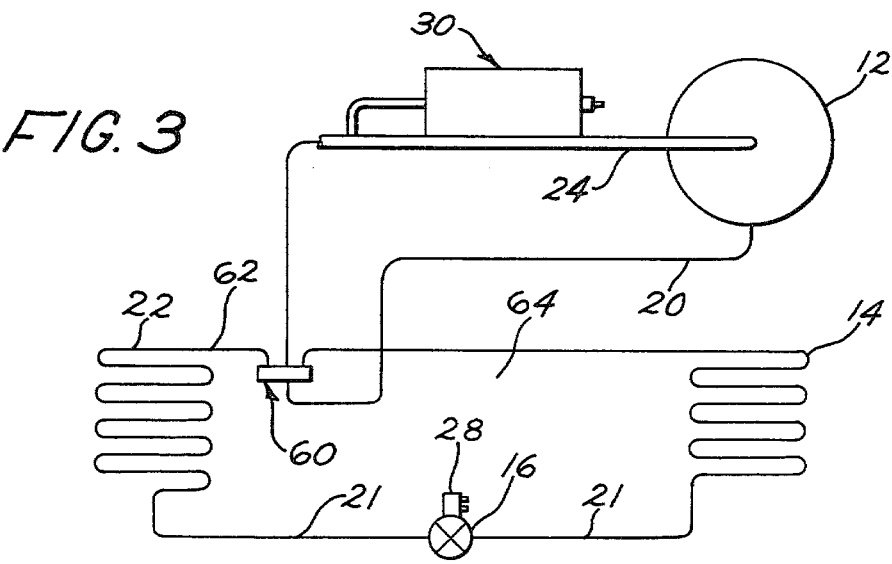
FIG. 3 is a diagrammatic view of a heat pump refrigeration system incorporating the present invention.

Referring now to FIG. 3 of the drawing, the refrigerant control system of the present invention is shown applied to the suction line of a heat pump refrigeration system and parts thereof, similar to the system as shown in FIG. 1, are indicated by like reference numerals. In the heat pump system, both the discharge line 20 and suction line 24 connected to the compressor 12 are interchangeably connected to the heat exchangers 22 and 14 through the system reversing valve 60. In this embodiment, the heat exchanger 14 is arranged outdoors and heat exchanger 22 is arranged indoors for heating or cooling an enclosure.

During operation of the system as a heat pump or during the heating cycle, the reversing valve 60 directs the flow of high temperature gaseous refrigerant from the discharge line 20 through a line 62 into the indoor heat exchanger 22 which now functions as a condenser to warm the air to be conditioned, and to condense the refrigerant gas into liquid form. The refrigerant then flows through liquid line 21 and expansion valve 16 to the outdoor heat exchanger 14 which is functioning as an evaporator and then back through valve 60, suction line 24, and into the compressor 12.

During the cooling cycle, high pressure refrigerant gas is directed by the reversing valve 60 through line 64 into the outdoor heat exchanger 14 which is now functioning as the condenser. The refrigerant from heat exchanger 14, now a liquid, flows through line 21, valve 16 to the indoor heat exchanger 22 now functioning as the evaporator. From the evaporator, refrigerant, now in gaseous phase, flows through the reversing valve 60 suction line 24 and back into the compressor 12.

In this embodiment, as shown in FIG. 3, the sensing member 30 is like in the embodiment of FIG. 1 in thermal contact with the suction line 24. Since the expansion valve controls refrigerant flow through it in either direction, only one expansion valve 16 is required in the heat pump system.

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

I claim:

1. A refrigerant flow control system for a refrigeration system of the type having a compressor including a discharge and suction conduit, a condenser, an electromechanical expansion means for regulating refrigerant flow in said system and an evaporator for receiving liquid phase refrigerant at an inlet and providing gaseous phase refrigerant at an outlet; means controlling said expansion means in accordance with the superheat condition at said suction conduit by regulating the admission of liquid phase refrigerant to said evaporator comprising:

a sensing member including a cavity;

a differential pressure responsive element arranged to divide said cavity into a first and second chamber with at least a portion of said sensing member including said second chamber being in thermal contact with said suction line;

a fluid in said second chamber having characteristics approaching or identical with those of the refrigerant employed in said system;

a conduit introducing gaseous phase refrigerant at suction line pressure to said first chamber so that said differential pressure responsive element is subjected on one side to saturation pressure of said fluid in said second chamber under influence of said suction line temperature and on the other side to refrigerant in said first chamber at suction line fluid pressure;

a differential pressure sensing means arranged on said differential pressure responsive element for sensing the difference in pressure between said first chamber and second chamber, said differential pressure sensing means including strain sensing resistive elements whose resistance varies as a function of pressure differential between said chambers;

a signal means for producing an electrical signal from the action of the said differential pressure sensing element for controlling operation of said electromechanical expansion means; and control means for causing said electric signal to activate said electro-mechanical expansion means for controlling the superheat condition of said gaseous phase refrigerant in said suction conduit in accordance with the pressure differential between said first and second chambers.

2. The refrigerant flow control system recited in claim 1 wherein said differential pressure responsive element is a diaphragm movable in response to internal pressure difference in said cavity.

3. The refrigerant flow control system recited in claim 2 wherein said differential pressure sensing means are arranged on the second chamber side of said diaphragm.

4. The refrigerant flow control system recited in claim 1 wherein said signal means further include a bridge circuit including two ballast resistors and said pressure resistive elements.

* * * * *